United States Patent
Park

(10) Patent No.: US 9,623,762 B2
(45) Date of Patent: Apr. 18, 2017

(54) METHOD AND SYSTEM OF DYNAMICALLY CHARGING ELECTRIC VEHICLE

(71) Applicant: LG CNS CO., LTD., Seoul (KR)

(72) Inventor: Doo Il Park, Seoul (KR)

(73) Assignee: LG CNS CO., LTD., Seoul (KR)

( * ) Notice: Subject to any disclaimer, the term of this patent is extended or adjusted under 35 U.S.C. 154(b) by 441 days.

(21) Appl. No.: 14/166,706

(22) Filed: Jan. 28, 2014

(65) Prior Publication Data

US 2014/0247019 A1    Sep. 4, 2014

(30) Foreign Application Priority Data

Mar. 4, 2013    (KR) ........................ 10-2013-0023010

(51) Int. Cl.
*H02J 7/32* (2006.01)
*B60L 11/18* (2006.01)
*B60L 3/04* (2006.01)

(52) U.S. Cl.
CPC ............... *B60L 11/185* (2013.01); *B60L 3/04* (2013.01); *B60L 11/1844* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y04S 10/126* (2013.01)

(58) Field of Classification Search
CPC ... A61N 1/3787; A61N 1/37223; H02J 5/005; H02J 50/20; H02J 50/80; H02J 2003/146; H02J 3/00; H02J 3/14; H02J 7/0021; H02J 7/0024; H02J 7/0054; Y02T 10/7005; Y02T 90/121; Y02T 90/128

USPC .................................................. 320/155–165
See application file for complete search history.

(56) References Cited

U.S. PATENT DOCUMENTS

| | | | | |
|---|---|---|---|---|
| 2005/0264263 A1* | 12/2005 | Tsenter | ................. | H02J 7/0072 320/128 |
| 2011/0221393 A1* | 9/2011 | Billmaier | .................. | H02J 3/02 320/109 |
| 2012/0249065 A1 | 10/2012 | Bissonette et al. | | |
| 2014/0121866 A1* | 5/2014 | Dangler | ................ | H02J 7/0029 701/22 |

FOREIGN PATENT DOCUMENTS

| | | |
|---|---|---|
| JP | 2010-028913 | 2/2010 |
| JP | 2011-083165 | 4/2011 |

(Continued)

OTHER PUBLICATIONS

European Patent Office Application Serial No. 14157575.3, Search Report dated Sep. 2, 2015, 7 pages.

(Continued)

*Primary Examiner* — Binh Tat
(74) *Attorney, Agent, or Firm* — Lee Hong Degerman Kang & Waimey

(57) ABSTRACT

A method for dynamically charging an electrically powered apparatus includes receiving a selection of a charging mode from a user, such that the selected charging mode is a fast charging mode or a slow charging mode. The method also includes dynamically scheduling a charging mode for charging the apparatus according to the selected charging mode and a status of a fast charging module, and electrically charging the apparatus according to the dynamically scheduled charging mode.

9 Claims, 5 Drawing Sheets

(56) References Cited

FOREIGN PATENT DOCUMENTS

| JP | 2011-182588 | 9/2011 |
| JP | 2012-070479 | 4/2012 |
| JP | 2012-210039 | 10/2012 |
| WO | 2012/070432 | 5/2012 |
| WO | 2012/120976 | 9/2012 |
| WO | 2013/009178 | 1/2013 |

OTHER PUBLICATIONS

Japan Patent Office Application Serial No. 2013-273563, Office Action dated Mar. 3, 2015, 6 pages.

* cited by examiner

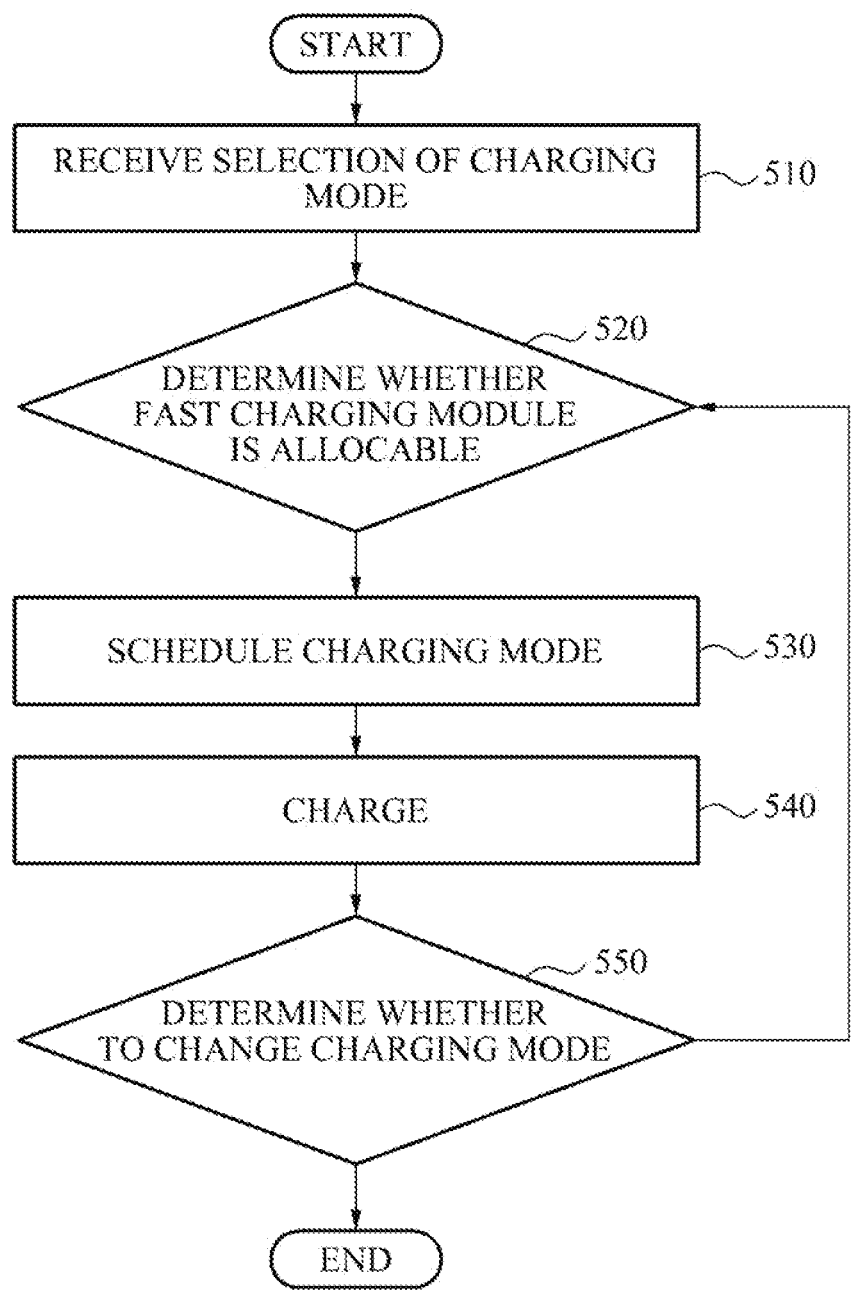

METHOD AND SYSTEM OF DYNAMICALLY CHARGING ELECTRIC VEHICLE

CROSS-REFERENCE TO RELATED APPLICATIONS

Pursuant to 35 U.S.C. §119(a), this application claims the benefit of earlier filing date and right of priority to Korean Patent Application No. 10-2013-0023010, filed on Mar. 4, 2013, the contents of which are hereby incorporated by reference herein in its entirety.

FIELD OF THE INVENTION

The present invention relates to a system and method of dynamically charging an electric vehicle, and more particularly, to a technology of dynamically charging an electric vehicle to support fast charging and slow charging in combination.

DESCRIPTION OF THE RELATED ART

Electric vehicle charging technology is used to charge an electric vehicle in either a fast charging mode or a slow charging mode, where fast charging includes direct current (DC) charging and slow charging includes alternating current (AC) charging.

In a conventional electric vehicle charging system, slow charging and fast charging are independently applied to physically separated ports. Some countries implement slow charging using a 5 pin inlet in accordance with the Korean Industrial Standards (KS), whereas fast charging may be implemented using a 10 pin inlet in accordance with the CHAdeMO standard established by a Japanese association. Thus, the conventional electric vehicle charging system may need to be constructed with separately configured interfaces for slow charging and fast charging.

Although electric vehicle manufactures in North America and Europe attempt to physically integrate interfaces for slow charging and fast charging into a single inlet, a system which enables management of slow charging and fast charging modes in an integrated manner is still under development.

SUMMARY

An aspect of the present invention provides a method, an apparatus and a system for supporting fast charging and slow charging in combination by using a common combo connector.

Another aspect of the present invention also provides a method, an apparatus and a system for dynamically scheduling a charging mode for a user based on whether a fast charging module is allocable.

Still another aspect of the present invention also provides a method, an apparatus and a system for dynamically changing a charging mode for a user between fast charging and slow charging while charging an electric vehicle of the user.

According to an aspect of the present invention, there is provided a method of dynamically charging an electric vehicle, the method including receiving a selection of at least one of a fast charging mode and a slow charging mode from a user, dynamically scheduling a charging mode for the user considering a circumstance of a fast charging module based on the selection, and charging an electric vehicle of the user based on the charging mode for the user.

The dynamically scheduling of the charging mode for the user may include determining whether a particular fast charging module is allocable among a plurality of fast charging modules and dynamically scheduling the charging mode for the user based on whether the particular fast charging module is allocable.

The method may further include indicating that the particular fast charging module is not allocable and determining the charging mode for the user as slow charging when the particular fast charging module is not allocable.

The receiving of the selection of at least one of the fast charging mode and the slow charging mode may receive a selection of at least one of the fast charging mode and the slow charging mode through a user interface (UI) and a network communication.

The method may further include dynamically changing the charging mode for the user between fast charging and slow charging.

The dynamically scheduling of the charging mode for the user considering the circumstance of the fast charging module based on the selection may include receiving a selection on the charging mode for the user as the fast charging and determining the charging mode for the user as the slow charging when the particular fast charging module is not allocable, and the dynamically changing of the charging mode for the user may include changing the charging mode for the user to the fast charging in response to that the particular fast charging module is allocable.

The dynamically changing of the charging mode for the user may include checking end time of the slow charging selected by the user and determining whether the end time of the slow charging is not expired or a preset period of time or longer remains before the end time of the slow charging.

The dynamically changing of the charging mode for the user dynamically may change the charging mode for the user between the slow charging and the fast charging based on at least one of whether an allocable fast charging module exists, reservation status of the fast charging and the slow charging of users, charging priority of each user, load due to charged power consumption and efficiency of consumed charged power.

The dynamically changing of the charging mode for the user may further include receiving a reselection on the charging mode for the user.

The charging of the electric vehicle of the user may conduct at least one of the fast charging and the slow charging through a common combo connector that supports fast charging and slow charging.

According to an aspect of the present invention, there is provided a method of dynamically charging an electric vehicle, the method including receiving a selection of a fast charging mode from a user, scheduling charging of an electric vehicle considering a circumstance of a fast charging module based on the selection, and adjusting an allocation of the fast charging module to control a charged amount of the electric vehicle in real time.

The scheduling of the charging of the electric vehicle may include scheduling charging of the electric vehicle based on at least one of allocation status, reservation status, a priority and network load of the fast charging module.

The method may further include verifying whether to select a slow charging mode with a slow charging module for waiting time.

According to an aspect of the present invention, there is provided a system for dynamically charging an electric vehicle, the system including a fast charging module to supply direct current (DC) charging power, a plurality of charging stands to connected to the fast charging module in parallel and to control the fast charging module based on a user input to charge an electric vehicle, and a dynamic fast charging sharing unit to schedule charging of the electric vehicle using the fast charging module based on the user input.

The system may further include a slow charging module to supply alternating current (AC) charging power to the electric car.

The charging stands may include a charging controller to select at least one of a fast charging mode with the fast charging module and a slow charging mode with a slow charging module based on the user input, a slow controller to control the slow charging module, a fast controller to control the fast charging module, and a dynamic fast charging sharing agent to provide the user input to the dynamic fast charging sharing unit.

The charging controller may conduct a change between the fast charging mode and the slow charging mode based on the user input.

The dynamic fast charging sharing unit may include a dynamic fast charging sharing server to schedule charging of the electric vehicle based on at least one of allocation status, reservation status, a priority and network load of the fast charging module and to verify whether to select a slow charging mode with a slow charging module for waiting time when a fast charging mode with the fast charging module is selected based on the user input received from a dynamic fast charging sharing agent.

The dynamic fast charging sharing server may enable the charging controller to adjust an allocation of the fast charging module to control a charged amount of the electric vehicle.

BRIEF DESCRIPTION OF THE DRAWINGS

These and other aspects, features, and advantages of the invention will become apparent and more readily appreciated from the following description of exemplary embodiments, taken in conjunction with the accompanying drawings.

FIG. 5 is a flowchart illustrating a dynamic electric vehicle charging method according to an exemplary embodiment of the present invention.

DETAILED DESCRIPTION

Figure 1:
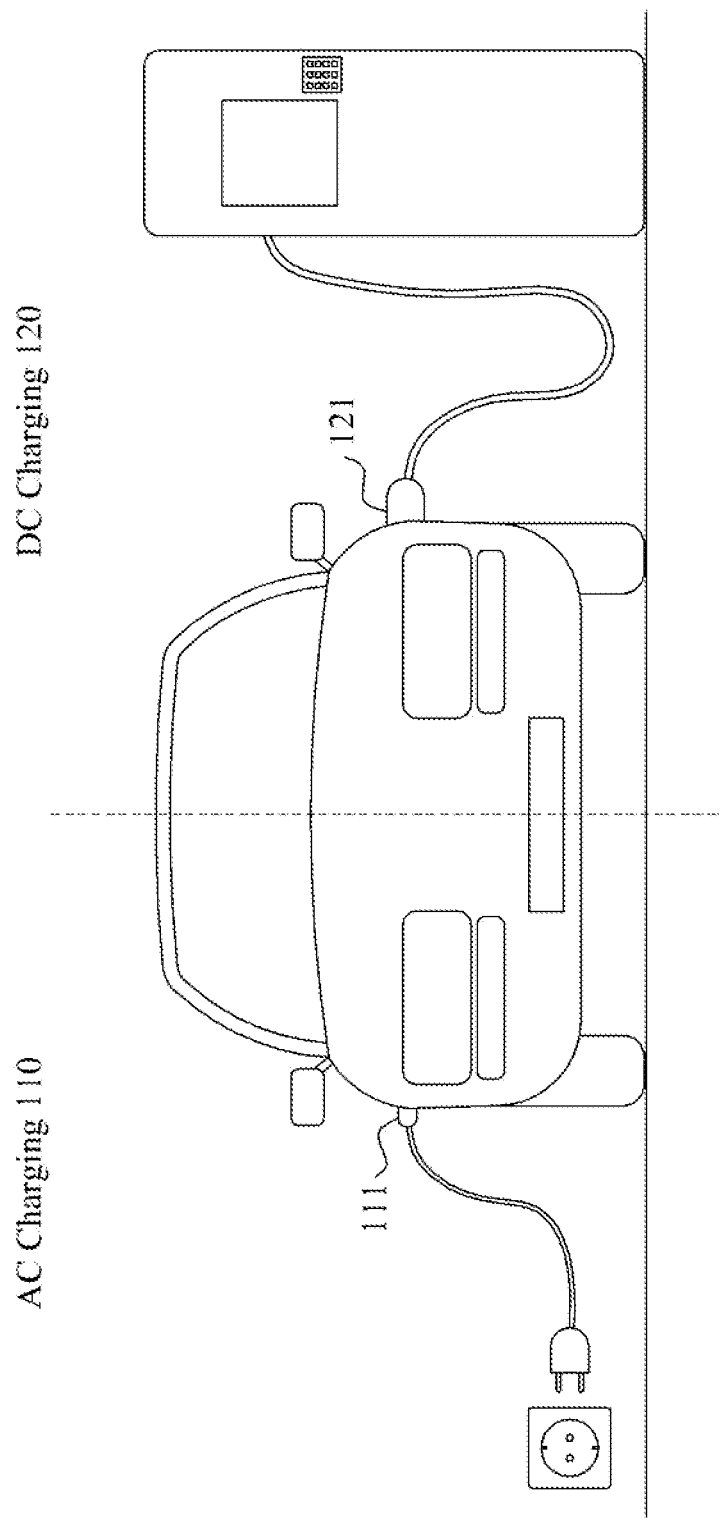
FIG. 1 illustrates an electric vehicle charging system.

Reference will now be made in detail to exemplary embodiments of the present invention, examples of which are illustrated in the accompanying drawings, wherein like reference numerals refer to the like elements throughout. Exemplary embodiments are described below to explain the present disclosure by referring to the accompanying drawings, however, the present disclosure is not limited thereto or restricted thereby.

In general, known functions or configurations will be omitted to enhance clarity. Also, terms used herein are defined to describe the exemplary embodiments of the present invention and thus may change depending on a user, the intent of an operator, or custom. Accordingly, terms used herein are to be defined in accordance with the overall description of this specification.

FIG. 1 illustrates an electric vehicle charging system and depicts an electric vehicle charging system that includes an alternating current (AC) charging system 110 and a direct current (DC) charging system 120. AC charging 110 generally refers to slow charging, while DC charging 120 generally refers to fast charging. The slow charging system 110 includes a slow charging inlet 111, while the fast charging system 120 includes a fast charging inlet 121. Specific reference herein will be made to charging of an electric vehicle, but such teachings apply equally to charging of other devices and apparatuses that are electrically powered.

In a conventional electric vehicle charging system, the slow charging 110 and the fast charging 120 are generally applied separately as shown in FIG. 1, and the slow charging inlet 111 and the fast charging inlet 121 are physically divided to form separate ports. In some situations, the slow charging inlet 111 includes a 5 pin inlet in accordance with the KS standard, and the fast charging inlet 121 includes a 10 pin inlet in accordance with the CHAdeMO standard established by a Japanese association. Thus the conventional electric vehicle charging system may need to be constructed with separate interfaces for slow charging and fast charging.

Figure 2:
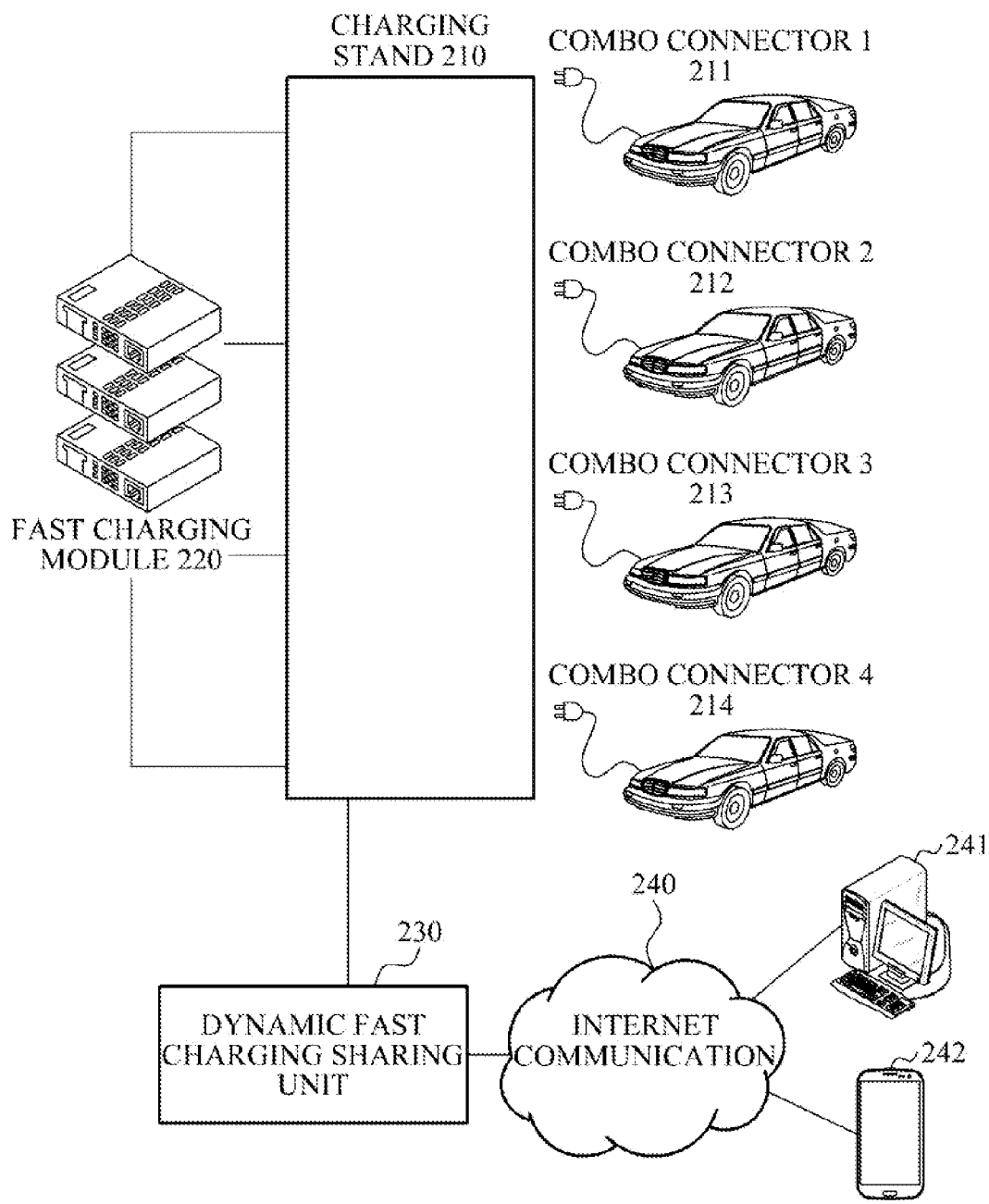
FIG. 2 illustrates a dynamic electric vehicle charging system according to an exemplary embodiment of the present invention.

FIG. 2 illustrates a dynamic electric vehicle charging system according to an exemplary embodiment of the present invention.

Referring to FIG. 2, the electric vehicle charging system is shown having a charging stand 210, a fast charging module 220 and a dynamic fast charging sharing unit 230. In addition, the dynamic electric vehicle charging system may further include a slow charging module to supply AC charging power to an electric vehicle. The fast charging module 220 may supply DC charging power.

The charging stand 210 is shown connected to the fast charging module 220 in parallel and controls the fast charging module 220 based on a user input to supply DC charging power to electric vehicles of users, thereby charging the electric vehicles. Further, the charging stand 210 may include a charging controller to select at least one of a fast charging mode with the fast charging module 220 and a slow charging mode with the slow charging module based on a user input, a slow controller to control the slow charging module, a fast controller to control the fast charging module 220, and a dynamic fast charging sharing agent to provide the user input to the dynamic fast charging sharing unit 230, which will now be described in detail.

The charging stand 210 may be connected to complex combo connectors 211, 212, 213 and 214, which are each respectively connected to electric vehicles of a first user, a second user, a third user, and a fourth user. Each of the complex combo connectors 211, 212, 213 and 214 may support both fast charging and slow charging.

In addition, the charging stand 210 may provide a user interface (UI) to the users to receive a user selection, and transmit the received user selection to the dynamic fast charging sharing unit 230, thereby supplying DC charging power provided from the fast charging module 220 to the respective electric vehicles of the users through the combo-connectors 211, 212, 213 and 214 based on a scheduling result of the dynamic fast charging sharing unit 230.

The dynamic electric vehicle charging system may include an AC power distribution board to supply AD charging power (AC power). The dynamic fast charging sharing unit 230 may dynamically schedule charging of the respective electric vehicles of the users using the fast charging module 220 based on inputs of the users received from the charging stand 210. Further, the dynamic fast charging sharing unit 230 may communicate with PC terminals 241 and mobile terminals 242 of the users through a network (e.g., Internet) communication 240 to receive each user selection on a charging method.

The dynamic fast charging sharing unit 230 of the dynamic electric vehicle charging system may include a dynamic fast charging sharing server, which may be configured in various forms, for example, using software installed on a separate terminal or computer or being mounted on a master charging stand among a plurality of charging stands.

Figure 3:
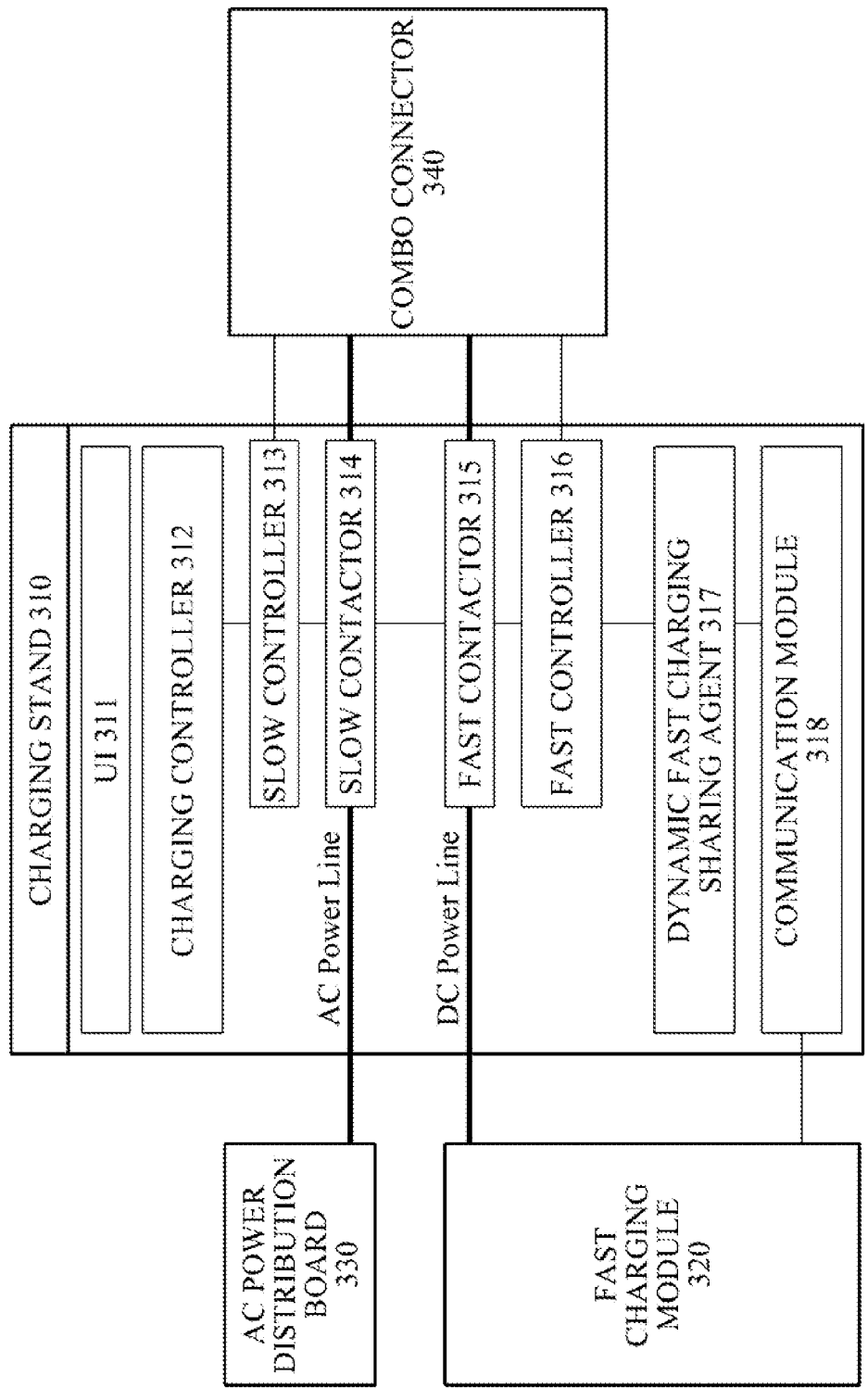
FIG. 3 illustrates one alternative for implementing the charging stand of FIG. 2 in accordance with an embodiment of the present invention.

FIG. 3 illustrates one alternative for implementing the charging stand of FIG. 2 in accordance with an embodiment of the present invention.

Referring to FIG. 3, the charging stand 310 includes a user interface (UI) 311, charging controller 312, a slow controller 313, fast controller 316, and a dynamic fast charging sharing agent 317. The charging controller 312 may select at least one of a fast charging mode with a fast charging module 320 and a slow charging mode with a slow charging module based on a user input. The slow controller 313 may also control the slow charging module through a slow contactor 314, the fast controller 316 may control the fast charging module 320 through a fast contactor 315, and the dynamic fast charging sharing agent 317 may provide the user input to a dynamic fast charging sharing unit.

The charging controller 312 may change between the fast charging mode and the slow charging mode based on a user input.

The charging stand 310 includes an AC power distribution board 330 to supply AC charging power, a UI 311 provided to users, and a communication module 318 enabling communications with the dynamic fast charging sharing unit.

The communication module 318 processes input received at the UI 311 and is connected to the dynamic fast charging sharing agent 317 to provide communications with the dynamic fast charging sharing unit and the fast charging module 320.

Further, a combo connector 340 is a complex combo connector 340 which is able to provide DC charging current and AC charging current. Thus, the combo connector 340 may support both fast charging and slow charging.

Figure 4:
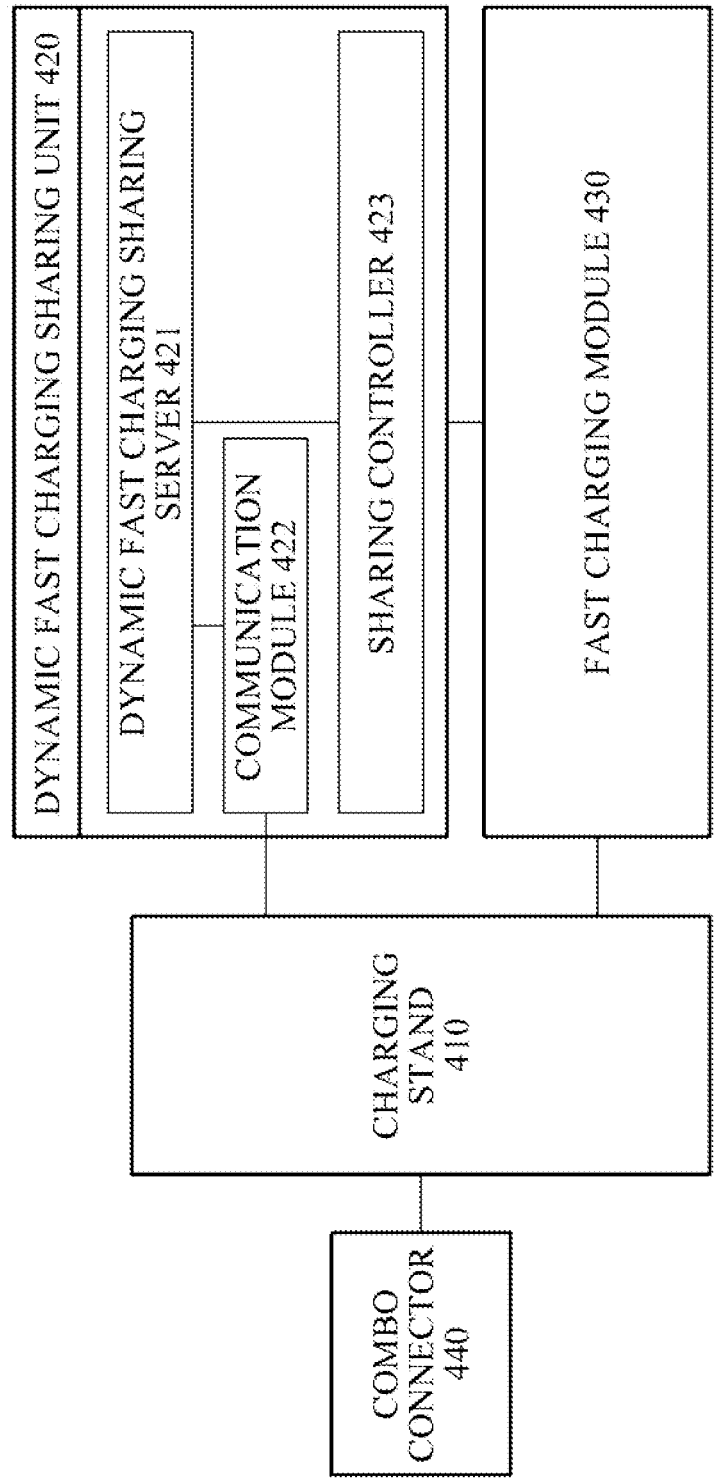
FIG. 4 illustrates one alternative for implementing the dynamic fast charging sharing unit of FIG. 2 in accordance with an embodiment of the present invention.

FIG. 4 illustrates one alternative for implementing the dynamic fast charging sharing unit of FIG. 2 in accordance with an embodiment of the present invention.

Referring to FIG. 4, the dynamic fast charging sharing unit 420 includes a dynamic fast charging sharing server 421, a communication module 422 and a sharing controller 423.

The dynamic fast charging sharing server 421 may be configured to schedule charging of an electric vehicle based on one or more of allocation status, reservation status, priority, and network load of a fast charging module 430, and verify whether to select a slow charging mode with a slow charging module for a waiting time when a fast charging mode with the fast charging module 430 is selected based on a user input received from a dynamic fast charging sharing agent. Also, the dynamic fast charging sharing server 421 may enable a charging controller to adjust an allocation of the fast charging module 430 to control a charged amount of the electric vehicle.

The communication module 422 provides communications with a PC terminal and a mobile terminal of a user through a network using the dynamic fast charging sharing server 421. Further, the communication module 422 may provide communications with a charging stand 410. The sharing controller 423 is connected to the dynamic fast charging sharing server 421 to control the fast charging module 430.

FIG. 5 is a flowchart illustrating a dynamic electric vehicle charging method according to an exemplary embodiment of the present invention.

Referring to FIG. 5, a dynamic electric vehicle charging system receives a selection of a fast charging mode, a slow charging mode, or both, from a user through a UI provided by a charging stand and network communications in operation 510. The selection result by the user received by the charging stand is transmitted to a dynamic fast charging sharing system through a communication module, and the dynamic electric vehicle charging system determines whether a particular fast charging module is allocable among a plurality of fast charging modules in operation 520.

The dynamic electric vehicle charging system dynamically schedules a charging mode for the user based on whether the particular fast charging module is allocable (e.g., available for use) in operation 530. When the particular fast charging module is not allocable, the dynamic electric vehicle charging system may report that the particular fast charging module is not allocable and determine the charging mode for the user as slow charging. For example, when a first user selects fast charging but a second user selecting fast charging before the first user occupies fast charging modules in advance, the dynamic electric vehicle charging system may notify the first user that the particular fast charging modules are not allocable based on a scheduling result through the charging stand and determine the charging mode for the first user as slow charging. In this way, when the charging mode for the first user is determined as slow charging, the dynamic electric vehicle charging system may determine the charging mode for the user as slow charging through reception of a reselection on the charging mode for the user or automatically.

The dynamic electric vehicle charging system charges an electric vehicle of the user based on the charging mode for the user in operation 540. Here, the charging may be carried out in at least one of a fast charging mode or a slow charging mode through a common combo connector that supports fast charging and slow charging.

The dynamic electric vehicle charging system determines whether to change the charging mode during a charging process in operation 550. The dynamic electric vehicle charging system may dynamically change the charging mode for the user between fast charging and slow charging based on a determination result while charging the electric car of the user. Here, the dynamic electric vehicle charging system may change the charging mode for the user to fast charging in response to the particular fast charging module being allocable. Further, the dynamic electric vehicle charging system may check a slow charging end time selected by the user and determine whether the slow charging end time does not expire for a preset period of time or that time remains before the slow charging is to end.

In detail, the dynamic electric vehicle charging system may dynamically change the charging mode for the user between slow charging and fast charging based on at least one or more of whether an allocable fast charging module exists, reservation status of fast charging and slow charging of users, charging priority of each user, load due to charged power consumption, and efficiency of consumed charged power. The dynamic electric vehicle charging system may receive a reselection on the charging mode for the user.

The changing of the charging mode may be carried out by a user request or automatically by a user selection received in advance from the user before charging starts. Further, the user request may be transmitted and received through not only a UI provided by the charging stand but a mobile terminal or PC terminal of the user.

The dynamic electric vehicle charging system supports a dynamic change in a charging mode for efficient use of a fast charging module having limited resources.

As described above, exemplary embodiments may provide a method, an apparatus and a system for supporting fast charging and slow charging in combination by using a common combo connector. Further, exemplary embodiments may provide a method, an apparatus and a system for dynamically scheduling a charging mode for a user based on whether a fast charging module is allocable. In addition, exemplary embodiments may provide a method, an apparatus and a system for dynamically changing a charging mode for a user between fast charging and slow charging while charging an electric vehicle of the user.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy discs, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents. Thus, other implementations, alternative embodiments and equivalents to the claimed subject matter are construed as being within the appended claims.

What is claimed is:

1. A method for dynamically charging an electrically powered apparatus, the method comprising:
   receiving a selection of a charging mode from a user, wherein the selected charging mode is a fast charging mode or a slow charging mode;
   dynamically scheduling a charging mode for charging the apparatus according to the selected charging mode and a status of a fast charging module; and
   providing an electrical charge according to the dynamically scheduled charging mode to permit charging of the apparatus
   wherein the dynamically scheduling the charging mode comprises:
   scheduling the charging mode as the slow charging mode when the selected charging mode is the fast charging mode and a status of the fast charging module is unavailable; and
   changing the charging mode as the fast charging mode in according to the status of the fast charging module is available.

2. The method of claim 1, wherein the dynamically scheduling the charging mode comprises:
   determining whether a particular fast charging module is available for charging, wherein the particular fast charging module is among a plurality of fast charging modules; and
   dynamically scheduling the charging mode according to whether a status of the particular fast charging module is available for changing.

3. The method of claim 2, further comprising:
   dynamically scheduling the charging mode as slow charging when a status of the particular fast charging module is not available.

4. The method of claim 1, wherein the receiving of the selection of the charging mode is via input over a network.

5. The method of claim 1, wherein the dynamically scheduling the charging mode further comprises:
   dynamically scheduling the charging mode according to the selected charging mode, the status of the fast charging module, and whether the slow charging mode has ended or whether a threshold amount of time remains before the slow charging mode ends.

6. The method of claim 1, wherein the dynamically scheduling the charging mode between the fast charging mode and the slow charging mode is based on at least one of:

whether a fast charging module among a plurality of fast charging modules is available, a reservation status of fast charging modules and slow charging modules, charging priority of users, charging load due to charging power consumption, or efficiency of consumed charged power.

7. The method of claim 1, wherein the dynamically changing of the charging mode user comprises receiving a reselection of the charging mode from the user.

8. The method of claim 1, wherein the charging of the electrically powered apparatus conducts at least one of a fast charging or a slow charging through a common combo connector that supports fast charging and slow charging.

9. A machine-readable non-transitory medium having stored thereon machine-executable instructions for:

receiving a selection of a charging mode from a user, wherein the selected charging mode is a fast charging mode or a slow charging mode;

dynamically scheduling a charging mode for charging the apparatus according to the selected charging mode and a status of a fast charging module; and providing an electrical charge according to the dynamically scheduled charging mode to permit charging of the apparatus, wherein the dynamically scheduling the charging mode comprises:

scheduling the charging mode as the slow charging mode when the selected charging mode is the fast charging mode and a status of the fast charging module is unavailable; and changing the charging mode as the fast charging mode in according to the status of the fast charging module is available.

* * * * *